United States Patent [19]

Maeda

[11] Patent Number: 4,802,544
[45] Date of Patent: Feb. 7, 1989

[54] ELECTRIC POWER STEERING APPARATUS HAVING MOTOR BRAKING FUNCTION

[75] Inventor: Naoyuki Maeda, Aichi, Japan
[73] Assignee: Tokai TRW & Co., Ltd., Aichi, Japan
[21] Appl. No.: 130,101
[22] Filed: Dec. 7, 1987

[30] Foreign Application Priority Data

Dec. 9, 1986 [JP] Japan ................. 61-292759

[51] Int. Cl.$^4$ .............................................. B62D 5/04
[52] U.S. Cl. .................................................. 180/79.1
[58] Field of Search ........................... 180/79.1, 142;
74/388 PS

[56] References Cited

U.S. PATENT DOCUMENTS 4,538,698  9/1985  Hashimoto ................... 180/79.1

FOREIGN PATENT DOCUMENTS 59-63264   4/1984  Japan .
59-63265   4/1984  Japan .
59-130780  7/1984  Japan .
59-130781  7/1984  Japan .

Primary Examiner—John A. Pekar
Attorney, Agent, or Firm—Tarolli, Sundheim & Covell

[57] ABSTRACT

There is an electric power steering apparatus comprising: an electronic control circuit to output a drive signal having a vehicle velocity response characteristic and steering response characteristic in accordance with the vehicle velocity, steering torque, and steering direction; and a motor for assisting a steering force which is made operative by the drive signal. The electronic control circuit has a braking control circuit to short-circuit between both terminals of the motor when the steering operation is stopped and the supply of the drive signal to the motor is stopped while the vehicle is running at a high speed. With this apparatus, when the steering operation is suddenly stopped when the vehicle is running at a high speed, the inertia rotation of the motor can be rapidly reduced. The yawing of the vehicle body due to the inertia rotation can be effectively prevented.

2 Claims, 5 Drawing Sheets

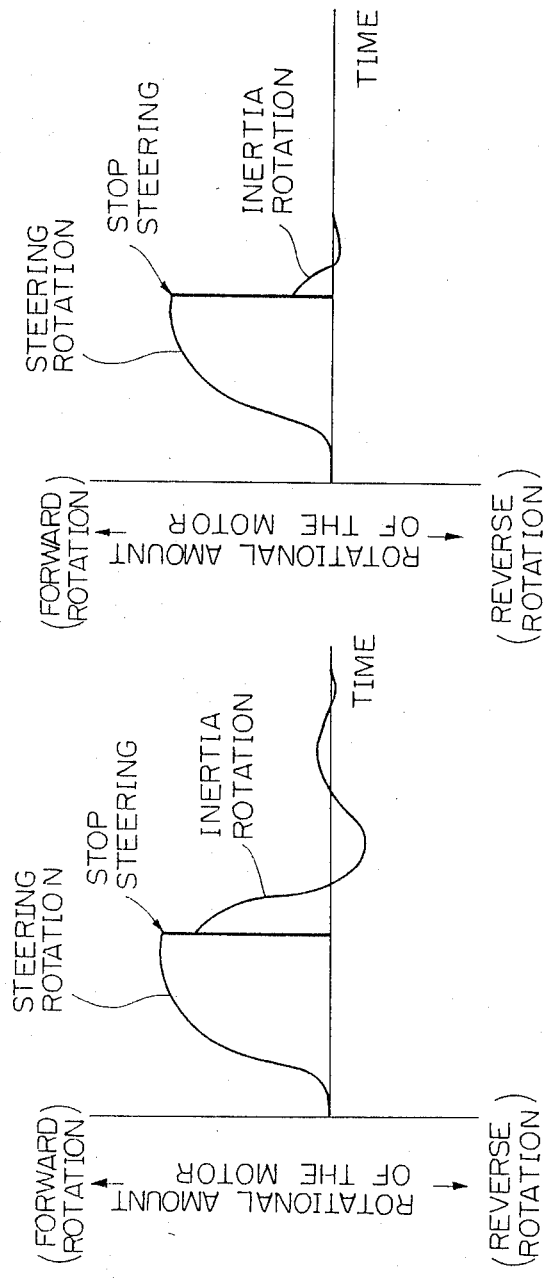

ELECTRIC POWER STEERING APPARATUS HAVING MOTOR BRAKING FUNCTION

FIELD OF THE INVENTION

The present invention relates to an electric power steering apparatus for assisting steering power by use of a motor and, more particularly, to an electric power steering apparatus having a motor braking function to improve the YAW characteristic due to an inertia rotation of the motor which is caused when the steering operation is stopped while a vehicle is running at a high speed.

DESCRIPTION OF THE RELATED BACKGROUND ART

As an electric power steering apparatus for assisting a steering power by use of a motor, for example, an electric power steering apparatus for braking the motor in the case where it is desirable to reduce the steering torque as in the high-speed running mode has previously been known.

Such a type of conventional apparatus, for example, has been known as an electric power steering apparatus disclosed in, e.g., Japanese Patent Public Disclosure (KOKAI) No. 59-130781 in 1984.

In such a conventional apparatus, when a load is connected to the coil of the motor, a current corresponding to a magnitude of the load flows through the coil. A power opposite to the force which is applied from the outside, i.e., the braking power (power generation braking) is produced. By use of this braking power, the steering torque is controlled so as to coincide with a reference torque. Practically speaking, by pulse-width controlling of the time when a resistive element as a load is connected to the motor, the braking power is adjusted in accordance with the steering condition.

In a conventional motor braking circuit, a pulse-width modulation (PWM) signal indicative of the steering torque is adjusted and a braking current is allowed to flow through a resistive element, as mentioned above. In such a motor braking circuit, if the steering wheel was suddenly stopped during the steering operation in the running mode, the value of the electric power energy, which is generated by the rotation of the motor due to the reactive rotation of the motor or the reverse thrust of the rack of the steering mechanism, is relatively small. Therefore, this electric power energy, i.e. the braking current cannot be sufficiently absorbed by the resistive element, so that yawing of the vehicle body occurs, causing the steering operability of the steering wheel to remarkably deteriorate.

SUMMARY OF THE INVENTION

It is, therefore, an object of the present invention to provide an electric power steering apparatus having a motor braking circuit which can improve the stalling characteristic of a motor for steering and which can prevent the yawing of a vehicle body when the steering operation is suddenly stopped while a vehicle is running at a high speed.

The electric power steering apparatus according to the invention has an electronic control circuit to drive a motor to assist the steering force in accordance with the running state, and the electronic control circuit further has a braking control circuit to short-circuit between both terminals of the motor when the steering operation is suddenly stopped when the vehicle is running at a speed higher than that of a preset value.

According to the invention, the braking control circuit operates so as to short-circuit between both terminals of the motor in response to the running state of the vehicle being at a speed higher than that of a preset value and so as to stop the steering operation. Thus, the power generation energy of the motor is promptly used as a braking energy, thereby rapidly reducing the inertia rotation of the motor.

BRIEF DESCRIPTION OF THE DRAWINGS

FIG. 5 shows characteristic curves of the rotational amount of the motor to the time for comparing the effects of the conventional technology and of the present invention.

DETAILED DESCRIPTION OF THE PREFERRED EMBODIMENT

Figure 2:
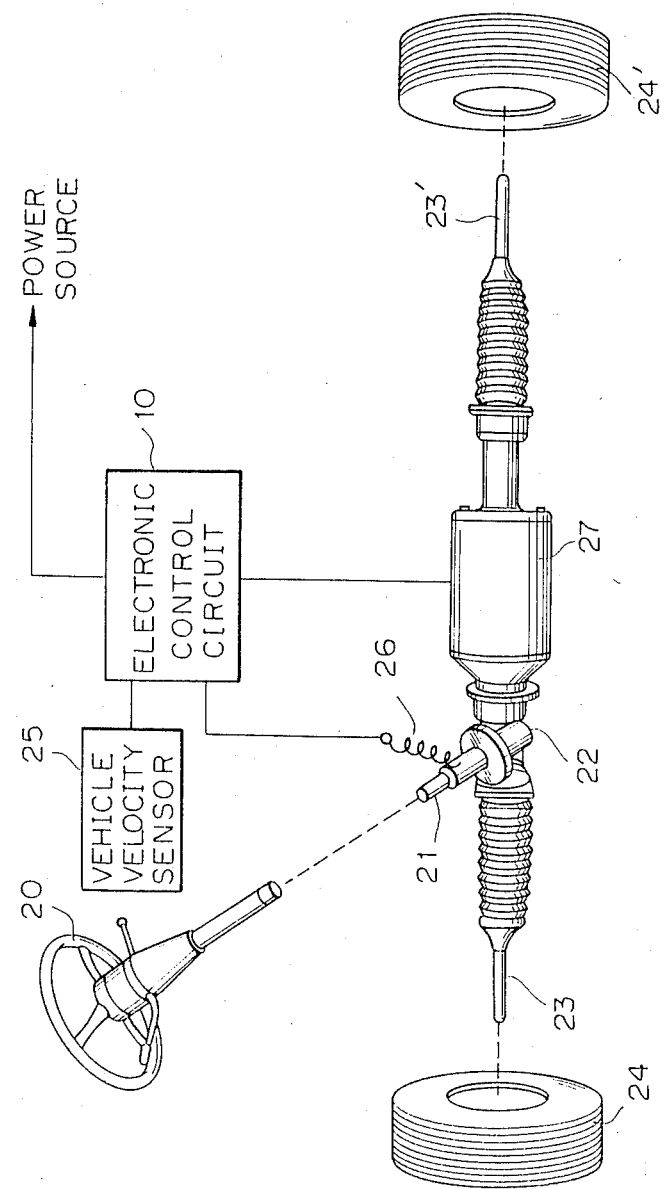
FIG. 2 is a schematic diagram showing the constitution of an electric power steering apparatus to assist the steering force using a motor to which a block circuit to FIG. 1 is applied.

FIG. 2 is a schematic diagram showing the constitution of an electric power steering apparatus to assist the steering force by use of a motor.

The operation of a steering wheel 20 is transferred through a steering input shaft 21 to a pinion rack gear (not shown) in a gear housing 22 and is further transferred to wheels 24 and 24' through tie rods 23 and 23'. During the operation, a vehicle velocity signal detected by a vehicle velocity sensor 25 and a steering load, i.e., a torque signal detected by a torque sensor 26 are supplied to the electronic control circuit 10. A driving electric power to a motor 27 is controlled so as to properly assist the steering force in accordance with the running state.

Figure 1:
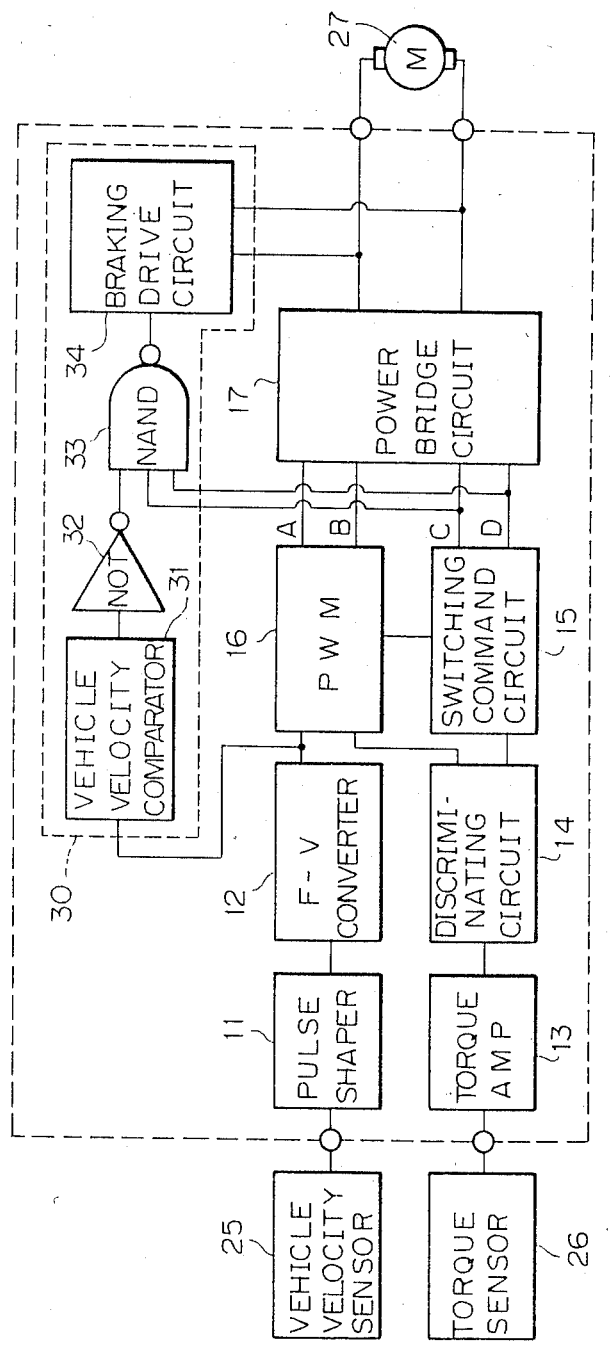
FIG. 1 is a block circuit diagram showing a practical constitution of an embodiment of the present invention.

FIG. 1 is a block circuit diagram showing a practical constitution of the electronic control circuit 10 of FIG. 2 having a braking function according to the invention.

A fundamental constitution of the electronic control circuit 10 has already been known in this technical field. An outline of this circuit will be described hereinbelow.

Figure 4:
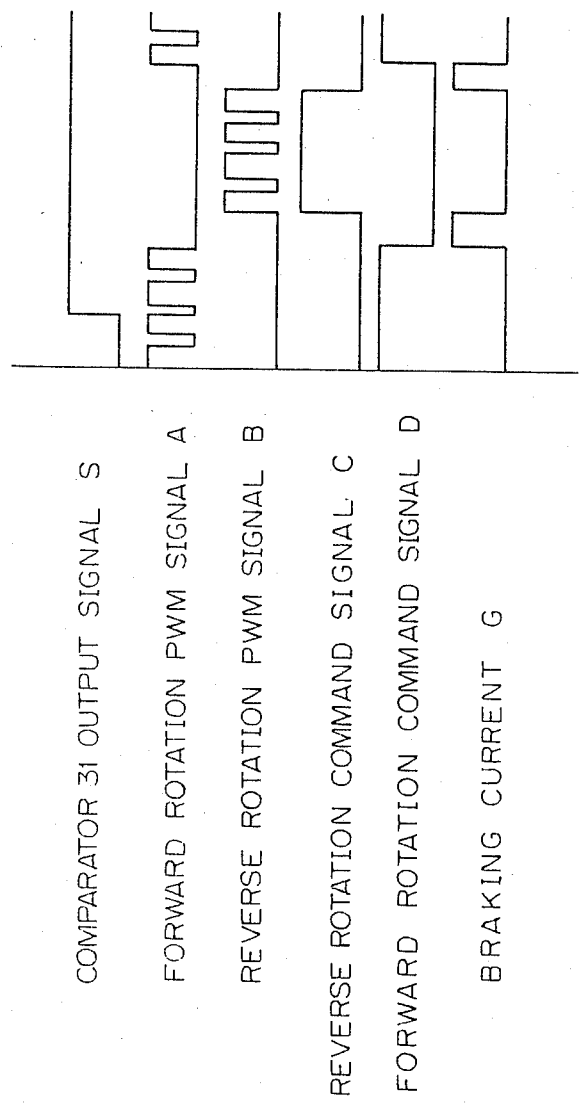
FIG. 4 is a signal waveform diagram for explaining the operation of block circuits of FIGS. 1 and 3.

The vehicle velocity signal detected by the vehicle velocity sensor 25 is converted into pulses by a pulse shaper 11. Further, the frequency of a series of vehicle velocity pulses is converted into a voltage signal by a frequency-to-voltage converter (F-V converter) 12. The torque signal detected by the torque sensor 26 is amplified by a torque amplifier 13 and thereafter, it is supplied to a steering direction discriminating circuit 14 to detect the steering direction of the steering wheel 20. The discriminating circuit 14 outputs a torque/direction signal consisting of a combination of the torque signal and the steering direction signal and also outputs the steering direction signal. A forward/reverse rotation switching command circuit 15 of the motor 27 outputs a forward/reverse rotation switching signal to a pulse-width modulator (PWM) 16 in response to the steering direction signal from the discriminating circuit 14. The command circuit 15 also supplies a reverse or forward rotation command signal (C or D in FIG. 4) to its output line C or D. The modulator 16 receives the vehicle velocity voltage signal from the F-V converter 12 and the torque/direction signal from the steering direction discriminating circuit 14. Further, in response to the forward/reverse rotation switching signal from the command circuit 15, the modulator 16 selectively outputs to an output line A or B a forward or reverse rotation PWM signal (A or B in FIG. 4) having the vehicle velocity response characteristic and steering response characteristic. In this manner, in response to the forward rotation PWM signal from the modulator 16 and the forward rotation command signal from the switching command circuit 15, a power bridge circuit 17 outputs an electric power signal so as to forwardly rotate the motor 27. In response to the reverse rotation PWM signal from the modulator 16 and the reverse rotation command signal from the switching command circuit 15, the power bridge circuit 17 outputs an electric power signal so as to reversely rotate the motor 27.

A braking control circuit 30 prevents the yawing of the vehicle body due to the inertia rotation of the motor 27, which is caused when the steering operation is stopped while the vehicle is running at a high speed. The braking control circuit 30 comprises a vehicle velocity comparator 31, an inverting circuit (NOT) 32, a gate circuit (NAND) 33, and a braking rive circuit 34.

Figure 3:
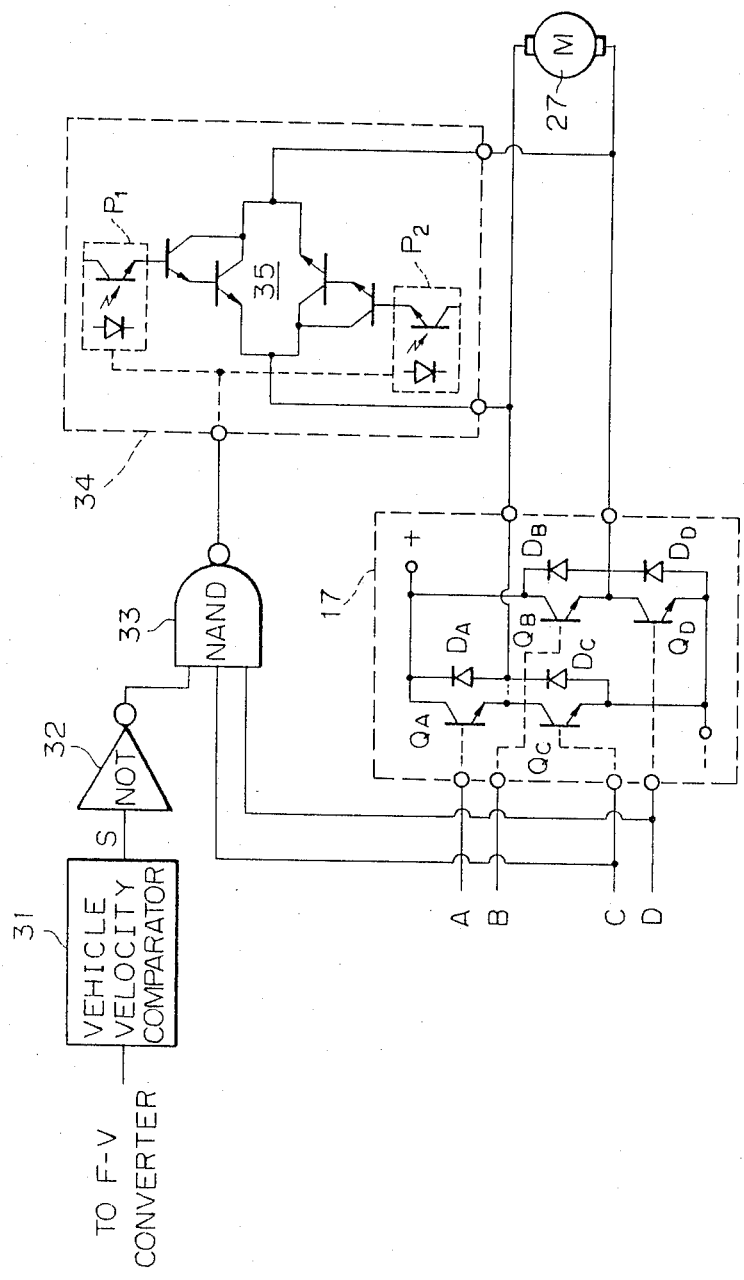
FIG. 3 is a partially detailed diagram of a block circuit of FIG. 1.

FIG. 3 shows a practical constitution of the braking control circuit 30 in FIG. 1, particularly, the braking drive circuit 34 together with a practical constitution of the power bridge circuit 17. As shown in the diagram, the braking drive circuit 34 comprises: photocouplers P$_1$ and P$_2$; and a bidirectional current supply circuit 35 consisting of power transistors Q$_1$ to Q$_4$, which are driven by the photocouplers. The power bridge circuit 17 comprises: transistors Q$_A$, Q$_B$, Q$_C$, and Q$_D$; and diodes D$_A$, D$_B$, D$_C$ and D$_D$ connected in parallel with the transistors, respectively.

When the forward rotation PWM signal is output to an output line A of the modulator 16 and at the same time, the forward rotation command signal is output to the output line D of the switching command circuit 15, the transistors Q$_A$ and Q$_D$ of the power bridge circuit 17 are made conductive. A drive current flows by the positive (+) power source so as to forwardly rotate the motor 27. Conversely, when the reverse rotation PWM signal is output to an output line B of the modulator 16 and the reverse rotation command signal is output to the output line C of the switching command circuit 15, the transistors Q$_B$ and Q$_C$ of the power bridge circuit 17 are made conductive. A drive current flows so as to reversely rotate the motor 27.

When the vehicle velocity signal generated from the F-V converter 12 exceeds a reference voltage corresponding to a vehicle velocity (e.g., 20 km/h) which has been preset in the vehicle velocity comparator 31, an output of the comparator, i.e., a high-level logic signal (S in FIG. 4) is inverted by the inverting circuit 32. Thus, a low-level logic signal is supplied to a first input terminal of the gate circuit 33.

When a steering operation is performed in such a running state, for example, when the steering operation is in a direction so as to forwardly rotate the motor, is suddenly stopped, an output signal from the torque sensor 26 is also stopped. Therefore, in response to the stop of the torque/direction signal from the steering direction discriminating circuit 14, the output of the forward rotation PWM signal of the output line A of the modulator 16 is stopped. Simultaneously, the output line D of the switching command circuit 15 is set to the logical low level in response to the stop of the steering direction signal from the discriminating circuit 14 (the output line C is at the logical low level).

Thus, the transistors Q$_A$ and Q$_D$ of the power bridge circuit 17 by which the motor was forwardly rotated are made nonconductive. The supply of the drive current to the motor is stopped and the motor immediately starts to generate an electric power.

At the same time, all of the inputs of the gate circuit 33 are at the logical low level, as mentioned above, so that a high-level logic signal is supplied as a braking command signal to the braking drive circuit 34. The braking command signal drives the photocouplers P$_1$ and P$_2$ and the bidirectional current supply circuit 35 is made conductive. Thus, both terminals of the motor 27 are short-circuited and the power generation current is promptly used as a braking current (G in FIG. 4) of the motor.

The case where the steering operation in association with the forward rotation of the motor was suddenly stopped has been described above. However, it will be understood that the operation when the steering operation in association with the reverse rotation was suddenly stopped can be similarly described in conjunction with the transistors Q$_B$ and Q$_C$ of the power bridge circuit 17.

FIG. 5 shows characteristic curves of the motor rotational amount of the time for comparing the effects of the conventional technique and the present invention.

As shown in the diagrams, according to the invention, when the steering operation is stopped while the vehicle is running at a high speed, both terminals of the motor assisting the steering can be directly short-circuited using a semiconductor current supply circuit and the inertia rotation can be promptly reduced. Thus, the yawing of the vehicle body due to the inertia rotation can be effectively prevented. Therefore, the steering control in the high-speed running mode can be remarkably improved.

What is claimed is:

1. An electric power steering apparatus comprising:
    an electronic control circuit adapted to output a drive signal which has a vehicle velocity response characteristic and a steering response characteristic in response to a vehicle velocity, a steering torque, and a steering direction;
    a motor for assisting a steering force which is made operative by said drive signal;
    said electronic control circuit having a braking control circuit to short-circuit between both terminals of said motor when a steering operation is stopped and the supply of said drive signal to said motor is stopped in its running state when said vehicle velocity exceeds a predetermined value;
    said braking control consisting of:
        a vehicle velocity comparator having a reference value corresponding to said predetermined value of vehicle velocity;
        a gate circuit adapted to output a braking command signal in response to an output signal of said vehicle velocity comparator and the stop of said steering operation; and
        a braking drive circuit adapted to short-circuit between both terminals of said motor in response to said braking command signal.

2. An electric power steering apparatus comprising:

an electric motor for providing power assist to vehicle steering; and an electronic control circuit for generating a drive signal in response to steering torque, steering direction, and vehicle velocity for actuating said electric motor;

said electronic control circuit comprising a braking control circuit to short-circuit said electric motor in response to said steering torque being removed and the vehicle velocity exceeding a predetermined value, said braking control circuit comprising:

a vehicle velocity comparator for comparing the vehicle velocity with said predetermined value of vehicle velocity and for generating an output signal in response to the vehicle velocity exceeding said predetermined value, a gate circuit for generating a braking command signal in response to said output signal, and a braking drive circuit actuatable in response to said braking command signal to short-circuit said electric motor.

* * * * *